United States Patent [19]

Kakuda et al.

[11] Patent Number: 5,795,091
[45] Date of Patent: Aug. 18, 1998

[54] RECLINE LATCH SYSTEM FOR COLLAPSIBLE STROLLER

[75] Inventors: Baku Kakuda, Reading; James A. Sack, Elverson, both of Pa.

[73] Assignee: Graco Children's Products Inc., Elverson, Pa.

[21] Appl. No.: 806,426

[22] Filed: Feb. 26, 1997

Related U.S. Application Data

[63] Continuation of Ser. No. 738,237, Oct. 25, 1996.

[51] Int. Cl.$^6$ .................................................. B25G 3/18
[52] U.S. Cl. .................... 403/325; 403/321; 403/326; 292/DIG. 60; 297/16.2
[58] Field of Search ........................ 403/325, 326, 403/321; 292/DIG. 60; 297/16.2, 46; 280/642, 650

[56] References Cited

U.S. PATENT DOCUMENTS

| | | | |
|---|---|---|---|
| D. 357,439 | 4/1995 | Haut et al. | D12/129 |
| 2,783,053 | 2/1957 | Sheldrick et al. | 280/41 |
| 2,966,365 | 12/1960 | Kortum | 280/47.37 |
| 3,277,601 | 10/1966 | Ryan | 46/161 |
| 3,533,648 | 10/1970 | Thieberger | 285/164 |
| 4,415,180 | 11/1983 | Payne, Jr. | 280/650 |
| 4,433,869 | 2/1984 | Payne, Jr. et al. | 280/650 X |
| 4,632,421 | 12/1986 | Shamie | 280/650 X |
| 4,660,850 | 4/1987 | Nakao et al. | 280/642 |
| 4,736,959 | 4/1988 | Van Steenburg | 280/30 |
| 4,805,928 | 2/1989 | Nakaot et al. | 280/642 |
| 4,809,724 | 3/1989 | Fuser | 135/16 |
| 4,858,947 | 8/1989 | Yee et al. | 280/643 |
| 4,886,289 | 12/1989 | Yee et al. | 280/643 |
| 4,907,818 | 3/1990 | Chai | 280/642 |
| 5,018,754 | 5/1991 | Cheng | 280/47.4 |
| 5,039,118 | 8/1991 | Huang | 280/47.371 |
| 5,056,805 | 10/1991 | Wang | 280/47.36 |
| 5,062,179 | 11/1991 | Huang | 16/111 R |
| 5,087,066 | 2/1992 | Mong-Hsing | 280/644 |
| 5,143,398 | 9/1992 | Teng | 280/642 |
| 5,167,425 | 12/1992 | Chen | 280/648 |
| 5,168,601 | 12/1992 | Liu | 16/126 |
| 5,184,835 | 2/1993 | Huang | 280/47.371 |
| 5,190,390 | 3/1993 | Ming-Tai | 403/24 |
| 5,201,333 | 4/1993 | Shalmon et al. | 403/325 X |
| 5,205,577 | 4/1993 | Liu | 280/642 |
| 5,221,106 | 6/1993 | Shamie | 280/644 |
| 5,244,228 | 9/1993 | Chiu | 280/642 |
| 5,257,799 | 11/1993 | Cone et al. | 280/642 |
| 5,454,584 | 10/1995 | Haut et al. | 280/642 |
| 5,482,311 | 1/1996 | Huang | 280/642 |
| 5,516,142 | 5/1996 | Hartan | 280/642 |
| 5,605,409 | 2/1997 | Haut et al. | 297/16.2 X |
| 5,622,377 | 4/1997 | Shamie | 297/16.2 X |

FOREIGN PATENT DOCUMENTS

2076300B 4/1984 United Kingdom.

Primary Examiner—Daniel P. Stodola
Assistant Examiner—Bruce A. Lev
Attorney, Agent, or Firm—Richard B. O'Planick

[57] ABSTRACT

A recline latch system for a collapsible stroller having a frame and a reclineable passenger support movable between at least one up position and a down position. The recline latch system includes a plate member connected to the frame for retaining the passenger support in the up position, a slidable member connected to the passenger support, wherein the slidable member is slidable between an engaged position and a disengaged position, and an engagement portion disposed on the slidable member, wherein the engagement portion is adapted to cooperate with the plate member when the slidable member is in the engaged position. The recline latch system preferably provides single-handed operation, multi-positional settings for the passenger support, and automatic disengagement while collapsing of the stroller.

18 Claims, 3 Drawing Sheets

RECLINE LATCH SYSTEM FOR COLLAPSIBLE STROLLER application is a continuation of U.S. patent application Ser. No. 08/738,237, filed Oct. 25, 1996.

BACKGROUND OF THE INVENTION

1. Field of the Invention

The present invention relates to a collapsible stroller, and more particularly, to a recline latch system for a collapsible stroller.

2. Discussion of the Related Art

Strollers that collapse or fold up provide highly convenient transportability. Consequently, such strollers have been very popular in the market. An example of a collapsible stroller is disclosed in U.S. Pat. No. 5,454,584 to Haut et al., the disclosure of which is incorporated by reference herein.

Such collapsible strollers usually include a frame and a with passenger support. Typically, the passenger support is movable with respect to the frame between an up position and a down position. The up position allows the passenger to be positioned in a seated position, whereas the down position allows the passenger to be in a recumbent position. As is well known in the art, it is usually necessary that the passenger support be in the down position when the user collapses the stroller. By placing the passenger support substantially in the same plan or orientation as the seat, the stroller is collapsed into a compact unit.

Latches are usually used to operate the collapsibility of the stroller. However, conventional latches require many complicated parts. This causes the latches to be bulky, thereby increasing the weight of the stroller. Furthermore, conventional latches are complicated to operate and often require two-handed operation.

SUMMARY OF THE INVENTION

Accordingly, the present invention is directed to a recline latch system that substantially obviates one or more of the problems due to limitations and disadvantages of the related art.

An object of the present invention to provide a recline latch system for a collapsible stroller which locks a passenger support in an up position that can be easily disengaged to recline the passenger support or to collapse the stroller.

Another object of the present invention is to provide a recline latch system which operate and cooperates with a stroller frame to allow convenient, ergonomic operation.

An additional object of the present invention is to provide a recline latch system which provides multi-positional settings for a passenger support.

A further object of the present invention is to provide a recline latch system having fewer, less complicated parts.

A still further object of the present invention is to provide a recline latch system which is easily manufactured and assembled at a minimal cost.

Yet another object of the present invention is to provide a recline latch system that can be operated with one hand.

Another object of the present invention is to provide a recline latch system which automatically disengages when the stroller is collapsed.

A further object of the present invention is to provide a recline latch system which reduces weight and bulk.

Additional features and advantages of the invention will be set forth in the description which follows, and in part will be apparent from the description, or may be learned by practice of the invention The objectives and other advantages of the invention will be realized and attained by the structure particularly pointed out in the written description and claims hereof as well as the appended drawings.

To achieve these and other advantages and in accordance with the purpose of the present invention, as embodied and broadly described, the recline latch system for a collapsible stroller having a frame and a reclineable passenger support movable between an up position and a down position, includes a place member connected to the frame for retaining the passenger support in the up position; a slidable member connected to the passenger support, wherein the slidable member is slidable between a first position (preferably an engaged position) and a second position (preferably a disengaged position); and an engagement portion disposed on the slidable member, wherein the engagement portion is adapted to cooperate with the plate member when the slidable member is in the first position.

It is to be understood that both the foregoing general description and the following detailed description are exemplary and explanatory and are intended to provide further explanation of the invention as claimed.

The accompanying drawings, which are included to provide a further understanding of the invention and are incorporated in and constitute a part of this specification, illustrate embodiments of the invention and together with the description serve to explain the principles of the invention. In the drawings, FIG. 1 is a perspective view of a left side recline latch system for a collapsible stroller;

DETAILED DESCRIPTION OF THE PREFERRED EMBODIMENTS

Figure 1:
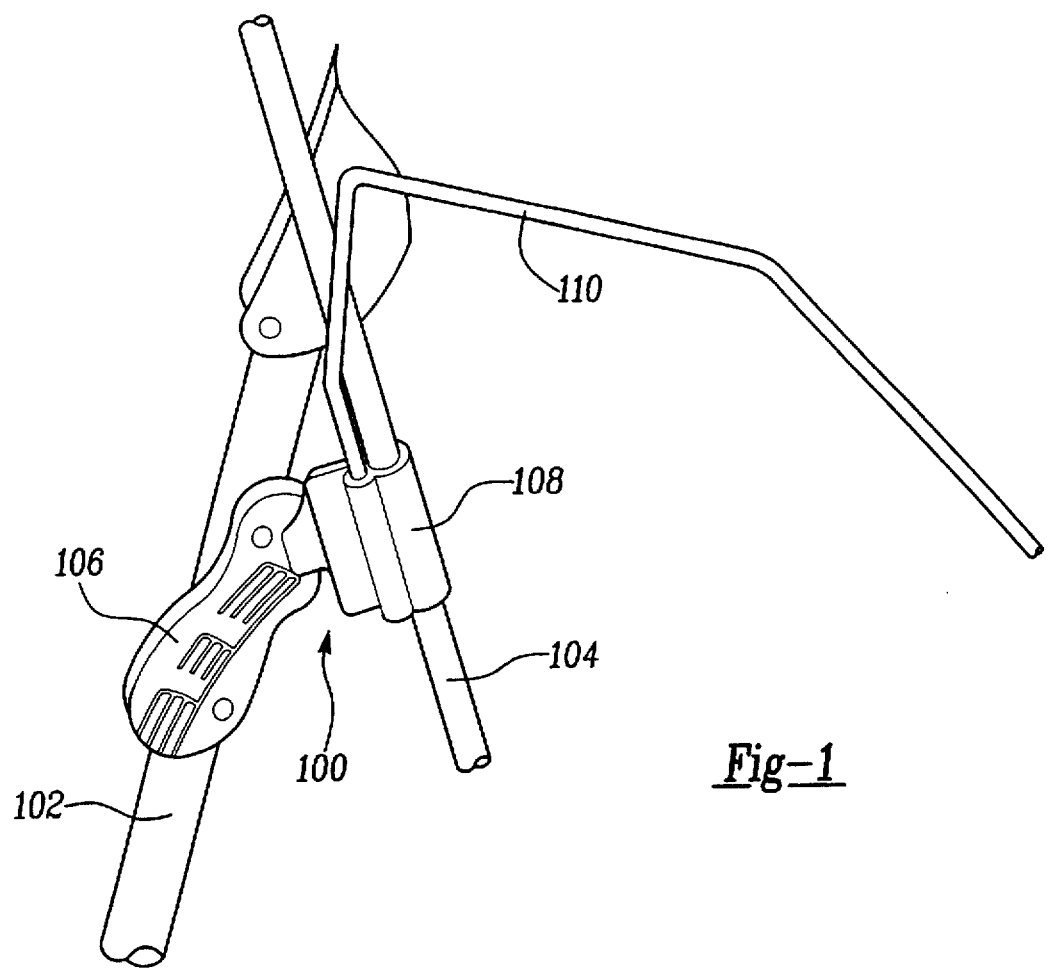

Reference will now be made in detail to the preferred embodiments of the present invention, examples of which are illustrated in the accompanying drawings. Wherever possible, the same reference numbers will be used throughout the drawings to refer to the same or like parts In accordance with the present invention, a recline latch unit includes right and left side recline latch systems. FIG. 1 shows a perspective view of a preferred left side recline latch system 100 on a collapsible stroller. The stroller also includes a frame 102 and a passenger support 104. Generally, the latch system 100 includes a plate member (or recline plate) 106 and a slidable member (or recline key) 108. The recline latch system 100 may include means for actuating the slidable member 108. In a preferred embodiment, a pull wire 110 actuates the slidable member 108 and a second slidable member (not shown) located on a side of the stroller opposite to that shown in FIG. 1. Alternatively, finger tabs can be formed on both slidable members 108 to actuate the recline latch system instead of the pull wire 110.

Figure 2:
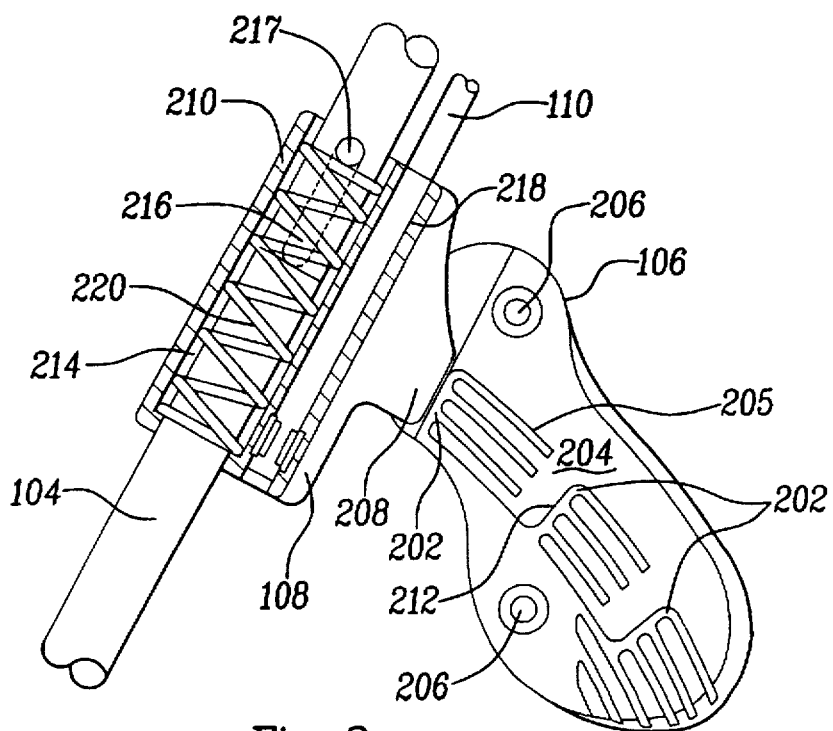
FIG. 2 is a front view of a right side recline latch system for a collapsible stroller showing the engagement of the slidable member with the plate member.

FIG. 2 shows the engagement of the slidable member 108 with the plate member 106. Here, slidable member 108 is shown in a cross sectional view. Referring to FIG. 2, the plate member 106 is a one piece member having an elongated, flat shape formed of a resilient material such as plastic. The plate member 106 includes at least one stop 202 rising from the plate surface 204. The preferred embodiment has a plurality of stops 202 so that the inclination of the passenger support 104 can be varied. While the stops 202 may be substantially solid, the stops 202 are preferably structured as a plurality of ribs 205 to facilitate fabrication, to reduce material usage, and to minimize friction between the slidable member 108 and the stop 202. Holes 206 are used to connect the plate member 106 to the frame (not shown in FIG. 2) using rivets, nuts and bolts, pins, or the like.

The slidable member 108 includes an engagement portion 208 extended from the body 210 of the slidable member. The engagement portion 208 is brought into contact with the face 212 of stops 202 by gravity or an elastic member acting on the passenger support 104. The slidable member 108 is mounted onto the passenger support 104 via a bore 214. The slidable member 108 is slidable between a first position and a second position Preferably, the first position corresponds the an engaged position, and the second position corresponds to a disengaged position. The range of movement of the slidable member 108 is limited by means such as a slot 216 on the sliding member 108 and a pin 217 mounted on support 104. The pin 217 may alternatively be a bolt, a rivet or the like. Pairs of slots 216 are preferably positioned on opposite sides of the slidable member 208. A spring 220 is located in the interior of the bore 214 between the body 210 and the passenger support 104 to bias the slidable member 10 toward the first covered position. The body 210 also defines a sleeve 218 for connecting the pull wire 110 to the slidable member 108. The pull wire 110 is adapted to actuate the slidable member 108 to a second, raised position. In the second position, the engagement portion 208 disengages the stop 202. As a result, the passenger support 104 can be relocated to other inclinations or to a fully reclined position. When the passenger support 104 is fully reclined, the plate member 106 and the slidable member 108 are separated.

FIGS. 3 to 7 show the plate member 106 from front, left, right, bottom, and rear views, respectively. FIG. 8 is a cross sectional view of the plate member 106 along line VIII—VIII of FIG. 3. As noted above, stops 202 are constructed with ribs. Each stop 202 has a face 212 and sloped portions 302. The sloped portions allow the engagement portion 208 to move easily over the stop as the passenger support 104 is being raised. Consequently, the user does not need to actuate the recline latch system 100 to raise the passenger support 104 Furthermore, a lead-in portion 304 is positioned at a lower region of the plate member 106. The lead-in portion 304 guides the engagement portion 208 (see FIG. 8) onto the plate member 106 when the passenger support is raised from a fully reclined position. Between each stop 202, gaps 306 provide regions in which the engagement portion 208 of the slidable member 108 is positioned to engage the respective face 212 of the stop 202. A catch 308 is provided on the upper end of the plate portion 106 to prevent raising the passenger support 104 too far (i.e., over-stroking). As a result, the engagement member 208 of the slidable member 108 cannot over-stroke the plate member 106. The rear of the plate member 106 defines a slot 310 so that the frame 102 securely retains the plate member 106.

Figures 3, 4, 5:
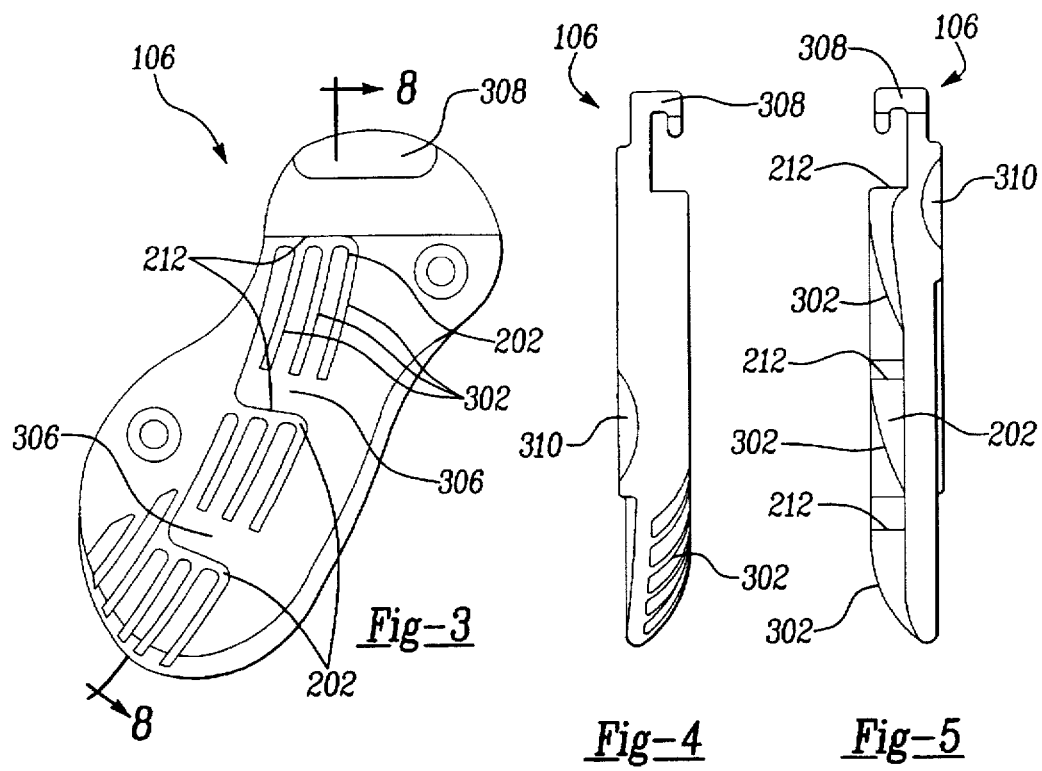
FIG. 3 is a top view of the place member of FIG. 2.
FIG. 4 is a left side view of the plate member of FIG. 3.
FIG. 5 is a right side view of the plate member of FIG. 3.
Figure 6:
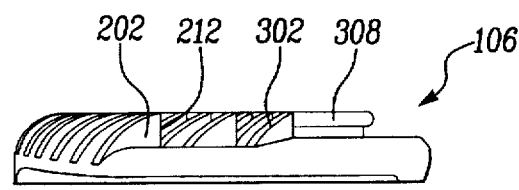
FIG. 6 is a front view of the plate member of FIG. 3.
Figures 7, 8:
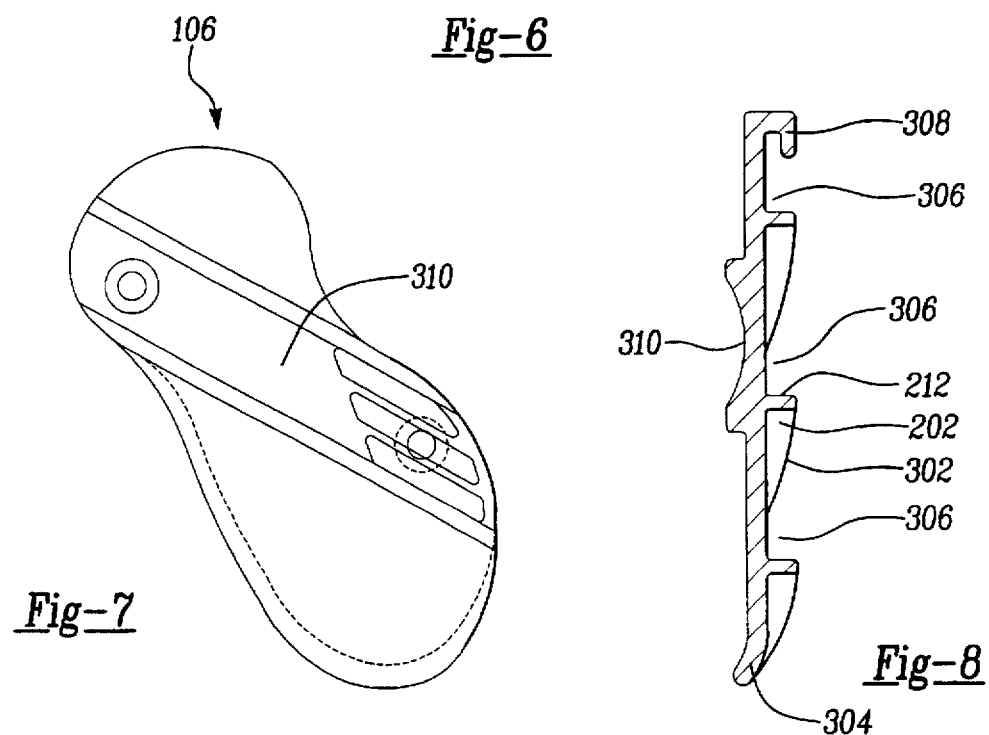
FIG. 7 is a bottom view of the plate member of FIG. 3.
FIG. 8 is a cross sectional view of the plate member along line VIII—VIII of FIG. 3.
Figure 9:
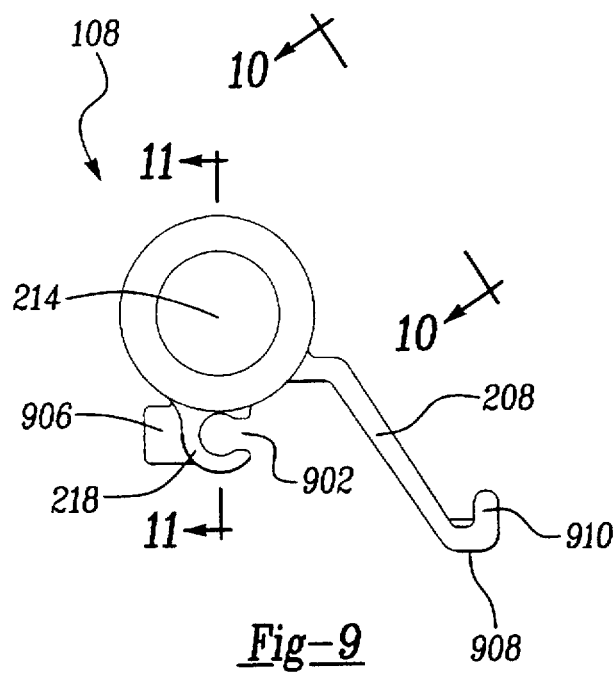
FIG. 9 is a top view of the slidable member of FIG. 2.
Figure 10:
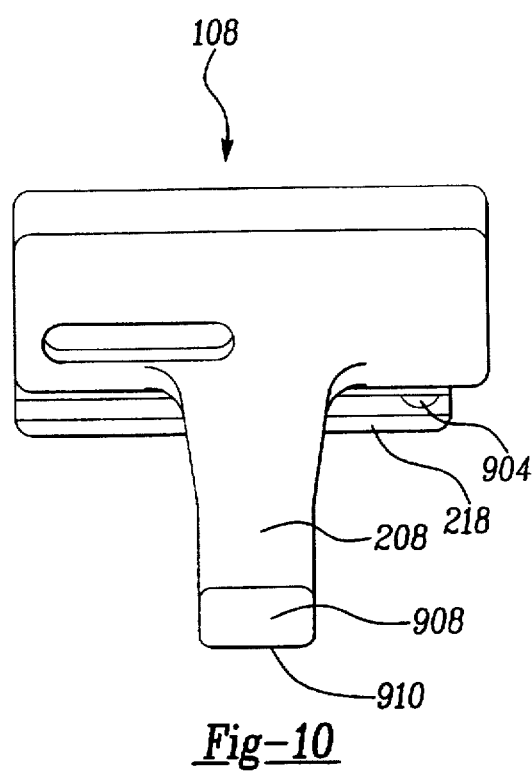
FIG. 10 is a side view of the slidable member from the direction indicated by line X—X of FIG. 9.
Figure 11:
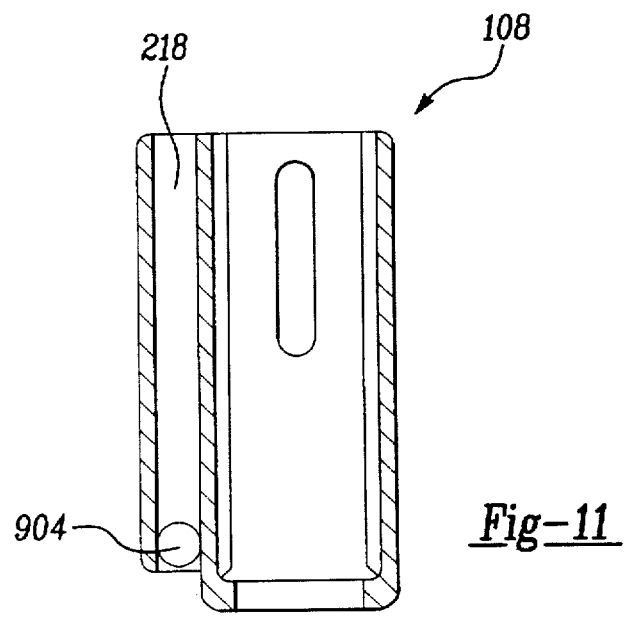
FIG. 11 is a cross-sectional view of the slidable member along line XI—XI of FIG. 9.

FIG. 9 shows a top view of the slidable member 108, figure 10 shows the slidable member 108 from the direction as indicated line X—X of FIG. 3, and FIG. 11 shows a cross sectional view of the slidable member 108 along line XI—XI of FIG. 3. As noted above, the slidable member 106 defines a bore 214 which is substantially circular. The slidable member 108 also includes a sleeve 218 for receiving and retaining the pull wire 110 which is inserted into sleeve 216 through the opening 902. The end of the pull wire 110 includes an L-shaped bend (not shown) which fits through the hole 904 of the sleeve 218, thereby securing the position of the pull wire 110 in the sleeve 218. The sleeve 218 includes a support collar 906 around the hole 904 to improve rigidity and strength of the sleeve 218 and to receive the L-shaped bend of the pull wire 110. As noted above, the slots 216 are preferably located on opposite sides of the slidable member 108. The engagement member 208 includes an engagement surface 908 to cooperate and engage the face 212 of the plate member 106. The engagement portion 208 also includes a catch 910 on the distal end thereof to cooperate with the catch 308 of the plate member 106. In the preferred embodiment, both catches 308 and 910 are substantially hook shaped So that they can mate with each other.

The operation of the recline latch system in accordance with the preferred embodiment of the present invention will now be described. To lower the passenger support 104, the user actuates the slidable member 104. Actuation is achieved in the preferred embodiment by pulling the pull wire 110, thereby moving the slidable member 108 up the passenger support 104 from the first position to the second, raised position. When the slidable member 106 is moved to the second position, the spring 220 is compressed. The engagement portion 208 is clear of the stops 202 when the slidable member 202 is in the second position. At this time, the user can move the passenger support 104 to alternate lower inclinations defined by the stops 202 or to the fully reclined position When the user releases the pull wire 110, the spring 220 will return the slidable member 108 to the first position.

To raise the passenger support 104, the user simply lifts the passenger support 104. As the passenger support 104 is lifted to a level where the engagement portion 208 contacts the plate member 106, the lead portion 304 guides the engagement portion 208 onto the plate member 106. Then, as the engagement portion 208 is lifted and encounters the stops 202, the sloped portions 302 guide the engagement portion 208 over the stops 202. During this, the engagement position deflects. As a result, the slidable member 108 does not need to be actuated by the user during raising of the passenger support 104. The engagement portion 208 can engage any desired stop 202 after the engagement portion 208 passes that stop, thereby holding the passenger support 104 in the desired inclination. The catches 308 and 910 prevent the engagement portion 208 from passing beyond the upper end of the plate member 106, thereby preventing over-stroking of the engagement portion 208.

When the user collapses the stroller, the recline latch system 100 automatically disengages. As is known in the art (see, e.g., U.S. Pat. No. 5,454,548 to Haut et al.), the passenger support 104 moves upward relative to the frame when the stroller frame is folded. As a result, the engagement portion 208 moves upward with respect to the plate member 106. This allows the engagement portion 203 to clear the stop 202 without the user actuating the slidable member 108 and fall to the lowered, recline position.

The present invention provides a recline latch system for a collapsible stroller which locks a passenger support in an up position. The recline latch system is easily operated with one hand when reclining the passenger support or collapsing the stroller. In addition, recline latch system is less complicated than conventional recline latch systems. Accordingly, the present recline latch system is simpler to manufacture and assemble.

It will be apparent to those skilled in the art that various modifications and variations can be made in the recline latch of the present invention without departing from the spirit or scope of the invention. Thus, it is intended that the present invention cover the modifications and variations of this invention provided they come within the scope of the appended claims and their equivalents.

What is claimed is:

1. A stroller, said stroller having a frame and a reclinable passenger support movable between at least one up position and a down position, the stroller comprising:

a plate member connected to the frame for retaining the reclinable passenger support in the up position, said plate member including a plurality of stops, each stop having a face portion and a sloped portion including a plurality of ribs perpendicularly disposed relative to said face portion;

a slidable member connected to the reclinable passenger support, wherein the slidable member is slidable between a first position and a second position; and an engagement portion disposed on the slidable member, wherein the engagement portion is adapted to cooperate with the plate member when the slidable member is in the first position.

2. The stroller according to claim 1, wherein the plate member includes a plurality of stops for cooperating with the engagement portion, the plurality of stops corresponding to a plurality of up positions of the passenger support.

3. The stroller according to claim 1, wherein the plate member includes at least one stop for cooperating with the engagement portion.

4. The stroller according to claim 3, wherein the stop includes a sloped portion for guiding the engagement portion over each stop.

5. The stroller according to claim 4, wherein each stop includes a face portion for retaining the engagement portion.

6. The stroller according to claim 1, wherein the plate member includes an over-stroke catch to retain the engagement member.

7. The stroller according to claim 1, therein the plate member includes a first over-stroke catch, and wherein the slidable member includes a second over-stroke catch, the first and second over-stroke catches cooperating to retain the engagement portion from sliding beyond an upper end of the plate member.

8. The stroller according to claim 1, wherein the second position of the slidable member disengages the engagement portion with the plate member.

9. The stroller according to claim 1, wherein the slidable member includes a spring to bias the slidable member in the first position.

10. The stroller according to claim 1, further comprising a pin which protrudes from the reclinable passenger support, wherein the slidable member defines a slot which cooperates with the pin to limit the movement of the slidable member.

11. The stroller according to claim 1, further comprising an actuation member for actuating the slidable member.

12. The stroller according to claim 11, wherein the actuation member includes a pull wire.

13. A stroller having a frame and a reclinable passenger support movable between a plurality of up positions, the reclinable passenger support having a pivot point such that said reclinable passenger support is pivotable, the stroller comprising:

a plate member connected to the frame for retaining the passenger support in each position of said up positions, said plate member including a plurality of stops, each stop being arcuately disposed on said plate member, said arc having a focal point corresponding to the pivot point of said reclinable passenger support, each stop includes a plurality of ribs on said sloped portion and perpendicularly disposed relative to each face portion;

a slidable member connected to the passenger support, wherein the slidable member is slidable between a first position and a second position; and an engagement portion disposed on the slidable member, wherein the engagement portion engages with the plate member when the slidable member is in the first position.

14. The stroller according to claim 13, wherein the plate member includes a plurality of stops for cooperating with the engagement portion, the plurality of stops corresponding to a plurality of up positions of the reclinable passenger support.

15. The stroller according to claim 13, wherein each stop includes a face portion for restraining the engagement portion.

16. The stroller according to claim 15, wherein each stop includes a sloped portion for guiding the engagement portion over the stop.

17. The stroller according to claim 13, wherein the second position of the slidable member disengages the engagement portion with the plate member.

18. The stroller according to claim 13, wherein the plate member includes a first over-stroke catch, and wherein the slidable member includes a second over-stroke catch, the first and second over-stroke catches cooperating to retain the engagement portion from sliding beyond an upper end of the plate member.

* * * * *